(12) United States Patent
Goto

(10) Patent No.: US 9,900,829 B2
(45) Date of Patent: Feb. 20, 2018

(54) COMMUNICATION DEVICE, METHOD FOR CONTROLLING THE COMMUNICATION DEVICE, AND PROGRAM

(71) Applicant: CANON KABUSHIKI KAISHA, Tokyo (JP)

(72) Inventor: Fumihide Goto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 14/338,218

(22) Filed: Jul. 22, 2014

(65) Prior Publication Data

US 2014/0334340 A1 Nov. 13, 2014

Related U.S. Application Data

(63) Continuation of application No. PCT/JP2014/050501, filed on Jan. 15, 2014.

(30) Foreign Application Priority Data

Jan. 25, 2013 (JP) ................. 2013-012137

(51) Int. Cl.
| | |
|---|---|
| *H04L 12/28* | (2006.01) |
| *H04W 48/16* | (2009.01) |
| *H04W 48/02* | (2009.01) |
| *H04W 84/20* | (2009.01) |
| *H04W 84/12* | (2009.01) |
| *H04W 84/18* | (2009.01) |

(52) U.S. Cl.
CPC ........... *H04W 48/16* (2013.01); *H04W 48/02* (2013.01); *H04W 84/20* (2013.01); *H04W 84/12* (2013.01); *H04W 84/18* (2013.01)

(58) Field of Classification Search
CPC .............................. H04W 48/00; H04W 88/00
See application file for complete search history.

(56) References Cited

U.S. PATENT DOCUMENTS

| | | | |
|---|---|---|---|
| 2010/0303001 A1* | 12/2010 | Tamura | H04W 88/06 370/315 |
| 2012/0099572 A1 | 4/2012 | Kato | |
| 2012/0106375 A1* | 5/2012 | Woo | H04W 84/20 370/252 |
| 2012/0178429 A1* | 7/2012 | Camps Mur | H04W 72/1215 455/418 |
| 2012/0322368 A1* | 12/2012 | Desai | H04W 76/023 455/41.1 |

(Continued)

FOREIGN PATENT DOCUMENTS

| | | |
|---|---|---|
| JP | 2008-035374 A | 2/2008 |
| JP | 2010-268300 A | 11/2010 |

(Continued)

*Primary Examiner* — Shukri Taha
(74) *Attorney, Agent, or Firm* — Canon USA, Inc., IP Division

(57) ABSTRACT

An object is to perform connection control for a wireless layer appropriate for service execution in an application layer.

A communication device determines to operate as an access point when serving as a device that provides a service in an application layer, whereas the communication device operates as a station when serving as a device that receives a service in the application layer.

8 Claims, 7 Drawing Sheets

(56) References Cited

U.S. PATENT DOCUMENTS

| | | | | |
|---|---|---|---|---|
| 2013/0057908 A1* | 3/2013 | Park | ................... | H04L 61/2015 |
| | | | | 358/1.15 |
| 2014/0010219 A1* | 1/2014 | Dor | ...................... | H04W 48/16 |
| | | | | 370/338 |
| 2014/0028435 A1* | 1/2014 | Brockway, III | .... | H04N 1/00315 |
| | | | | 340/3.1 |
| 2014/0028817 A1* | 1/2014 | Brockway, III | .... | H04N 5/23206 |
| | | | | 348/61 |
| 2015/0023183 A1* | 1/2015 | Ilsar | .................... | H04W 48/16 |
| | | | | 370/244 |
| 2015/0341909 A1* | 11/2015 | Agardh | ............ | H04W 74/0816 |
| | | | | 370/329 |

FOREIGN PATENT DOCUMENTS

| | | |
|---|---|---|
| JP | 2012-090205 A | 5/2012 |
| JP | 2012-170898 A | 9/2012 |
| WO | 2010/047084 A1 | 4/2010 |
| WO | 2010/073542 A1 | 7/2010 |
| WO | 2010/103758 A1 | 9/2010 |

\* cited by examiner

FIG. 3
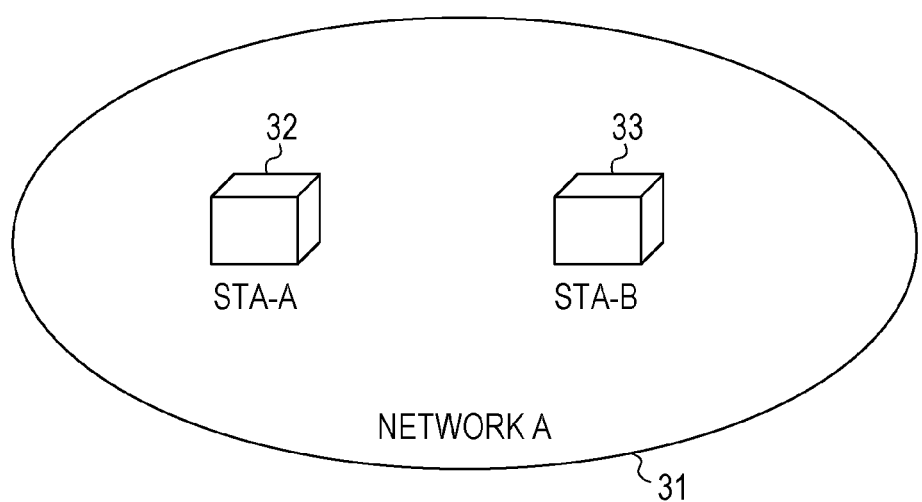
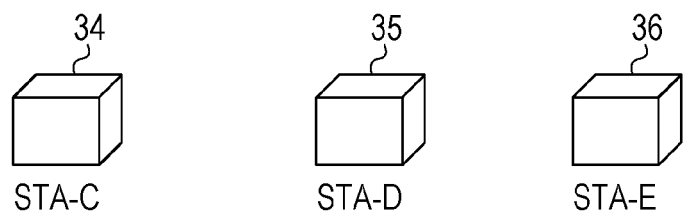

COMMUNICATION DEVICE, METHOD FOR CONTROLLING THE COMMUNICATION DEVICE, AND PROGRAM

CROSS-REFERENCE TO RELATED APPLICATIONS

This application is a Continuation of International Patent Application No. PCT/JP2014/050501, filed Jan. 15, 2014, which claims the benefit of Japanese Patent Application No. 2013-012137, filed Jan. 25, 2013, both of which are hereby incorporated by reference herein in their entirety.

TECHNICAL FIELD

The present invention relates to a communication device, a method for controlling the communication device, and a program.

BACKGROUND ART

In recent years, there have been a growing number of cases where an electronic device, such as a digital camera or a printer, is equipped with a wireless LAN station function, connected to a wireless LAN, and used as a communication device. For example, Patent Literature (PTL) 1 discloses a method in which a digital camera is equipped with a wireless LAN function to facilitate image sharing.

The Wi-Fi Alliance established a standard called Wi-Fi Direct (registered trademark). The Wi-Fi Direct defines a protocol that determines whether each electronic device operates as a wireless LAN access point or a wireless LAN station. Executing the protocol can automatically determine which electronic device serves as a wireless LAN access point and which electronic device serves as a wireless LAN station, and this improves user convenience.

A function (service discovery function) that searches for the content of a service provided in an application layer by another device is defined as an optional function of the Wi-Fi Direct. The service discovery function improves user convenience, because it enables the user to obtain information about a service provided by an electronic device, which is a connection partner, before execution of connection processing.

CITATION LIST

Patent Literature

PTL 1 Japanese Patent Laid-Open No. 2011-35768

As described above, an electronic device is used as a communication device to improve convenience. The user can obtain information about a service supported by an application layer of a communication partner before connection thereto.

In using a service in the application layer, there are cases where it is appropriate that the communication device be a wireless LAN access point and that the communication device be a wireless LAN station.

However, because connection control for a wireless layer, such as a wireless LAN, is independent of service control for the application layer, a wireless layer function not appropriate for service execution may operate.

An object of the present invention is to perform connection control for a wireless layer appropriate for service execution in an application layer.

SUMMARY OF INVENTION

To achieve the object described above, a communication device according to the present invention includes forming means for forming a network by operating the communication device as an access point, joining means for joining the network by operating the communication device as a station, and determining means for determining whether to operate the communication device as the access point or as the station. When the communication device operates as a device that provides a service in an application layer, the determining means determines to operate the communication device as the access point, whereas when the communication device operates as a device that receives a service in the application layer, the determining means determines to operate the communication device as the station.

A communication device according to the present invention includes forming means for forming a network by operating the communication device as an access point, joining means for joining the network by operating the communication device as a station, determining means for determining whether to operate the communication device as the access point or as the station, and restricting means for restricting the operation of the communication device as the station when the communication device operates as a device that provides a service in an application layer.

A communication device according to the present invention includes forming means for forming a network by operating the communication device as an access point, joining means for joining the network by operating the communication device as a station, determining means for determining whether to operate the communication device as the access point or as the station, and restricting means for restricting the operation of the communication device as the access point when the communication device operates as a device that receives a service in an application layer.

Further features of the present invention will become apparent from the following description of exemplary embodiments with reference to the attached drawings.

BRIEF DESCRIPTION OF DRAWINGS

FIG. 3 illustrates a network configuration to which the present invention is applied.

DESCRIPTION OF EMBODIMENTS

First Embodiment

A communication device according to the present embodiment will now be described in detail with reference to the drawings. Although the following describes an example where a wireless LAN system compliant with the IEEE 802.11 series is used, the communication configuration is not necessarily limited to a wireless LAN compliant with the IEEE 802.11.

A hardware configuration in a preferred example of the present embodiment will be described.

Figure 1:
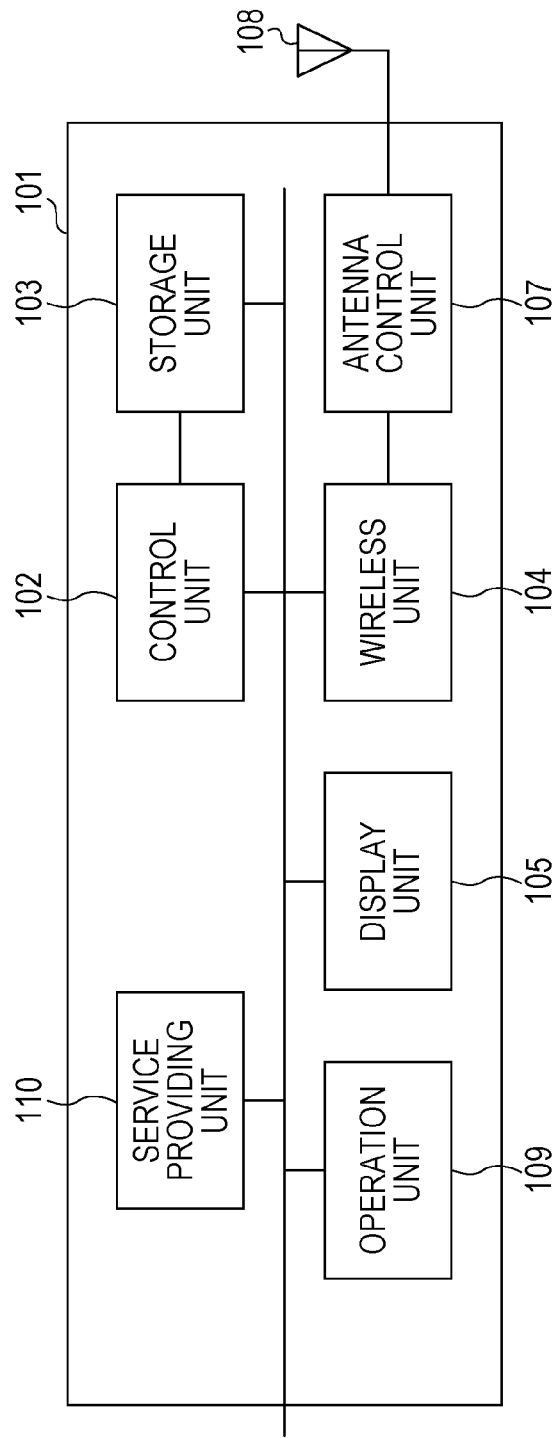
FIG. 1 is a diagram illustrating blocks included in a device.

FIG. 1 is a block diagram illustrating an exemplary configuration of each device (described below) according to an embodiment to which the present invention is applicable. Reference numeral 101 denotes an entire device. Reference numeral 102 denotes a control unit that controls the entire device by executing a control program stored in a storage unit 103. The control unit 102 includes one or more processors, such as a CPU and an MPU. The control unit 102 also controls setting of communication parameters between this device and another device. Reference numeral 103 denotes a storage unit that stores the control program executed by the control unit 102 and various types of information, such as communication parameters. The storage unit 103 may also store image data and files generated by the communication device or received from an external device. The storage unit 103 includes various memories, such as a ROM, a RAM, a HDD, and a flash memory. Various operations described below are carried out when the control unit 102 executes the control program stored in the storage unit 103.

Reference numeral 104 denotes a wireless unit for performing wireless LAN communication compliant with the IEEE 802.11 series. Reference numeral 105 denotes a display unit that performs various display operations. The display unit 105 is capable of outputting visually perceptible information, like an LCD or an LED, or is capable of outputting sound, like a speaker. The display unit 105 has a function of outputting at least one of visual information and audio information.

Reference numeral 107 denotes an antenna control unit, and reference numeral 108 denotes an antenna. The antenna 108 is controlled to transmit and receive signals via wireless communication. Reference numeral 109 denotes an operation unit that allows the user to perform various input operations and to operate the communication device. The operation unit 109 includes various buttons and a touch panel.

A service providing unit 110 has a function of providing a service in an application layer of the communication device. For example, if the communication device is a printer, the service providing unit 110 provides a print function, and if the communication device is a digital camera, the service providing unit 110 provides an image pickup function.

The hardware configuration illustrated in FIG. 1 is merely an example, and the communication device 101 may have a hardware configuration different from that illustrated in FIG. 1.

Figure 2:
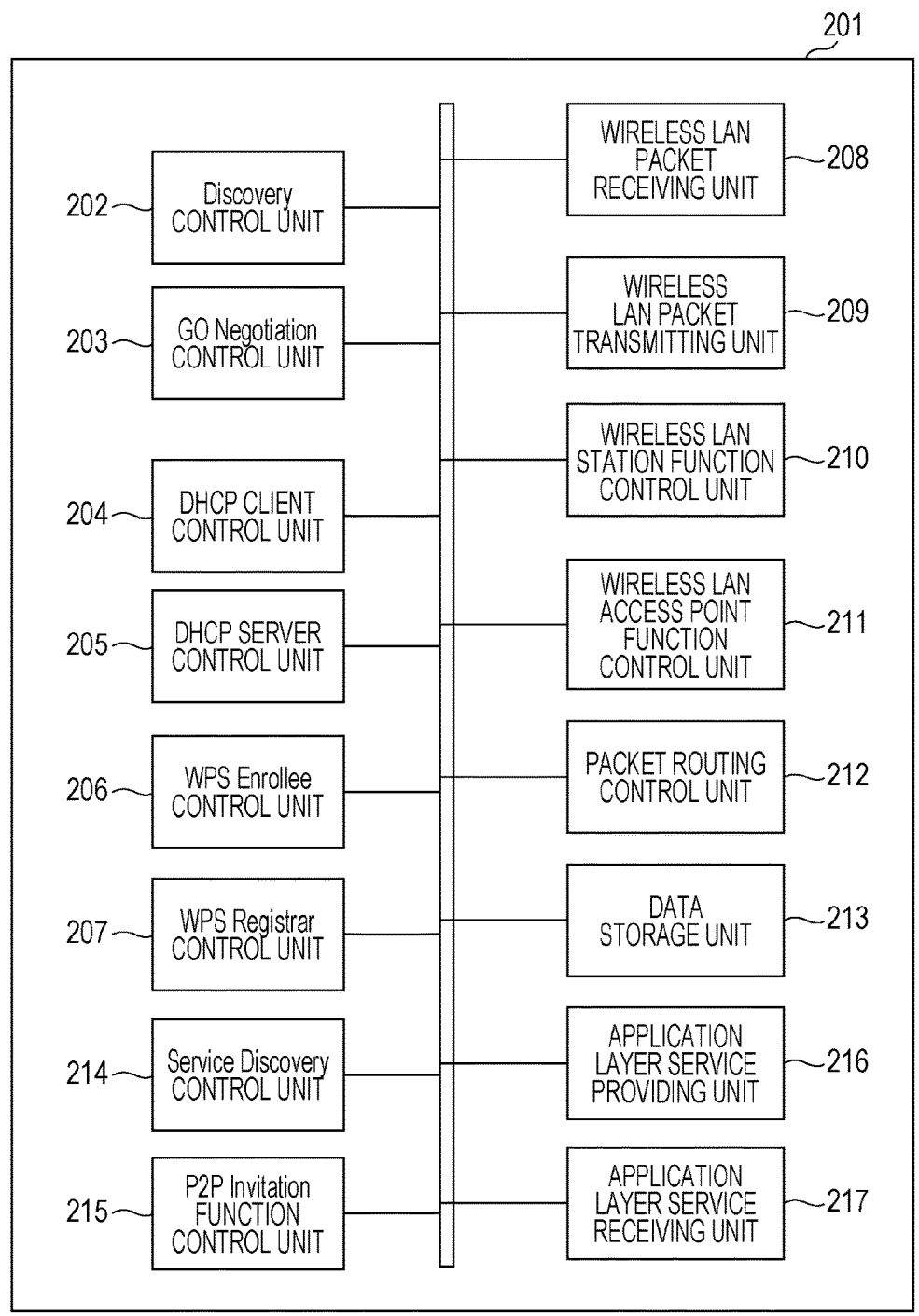
FIG. 2 is a diagram illustrating software function blocks in the device.

FIG. 2 is a block diagram illustrating an exemplary configuration of software function blocks for executing a communication control function (described below). Reference numeral 201 denotes an entire software function block. Reference numeral 202 denotes a Discovery control unit that performs search processing that searches for a communication device serving as a communication partner.

Reference numeral 203 denotes a GO Negotiation control unit. The GO Negotiation control unit 203 performs control based on the Wi-Fi Direct protocol specification and determines which of communication devices serves as a wireless LAN access point and which of the communication devices serves as a wireless LAN station. That is, the GO Negotiation control unit 203 determines the role of each communication device in a wireless layer. In the Wi-Fi Direct, a communication device that implements a wireless LAN access point function is referred to as a P2P group owner (hereinafter referred to as GO), and a communication device that implements a wireless LAN station function is referred to as a P2P client (hereinafter referred to as CL). A wireless LAN access point function control unit 211 (described below) operates when the communication device serves as a GO or wireless LAN access point, and a wireless LAN station function control unit 210 (described below) operates when the communication device serves as a CL or wireless LAN station. The GO Negotiation protocol is determined by the Wi-Fi Direct specification. The GO Negotiation protocol will not be described here, because it is not the focus of the present invention. In the Wi-Fi Direct, a network formed by a GO is referred to as a P2P group. In the present embodiment, a network may also be referred to as a P2P group. In the present embodiment, the terms "network" and "P2P group" are used synonymously.

In the present specification, a P2P group owner (GO), a P2P client (CL), and a group of communication devices having an undetermined role are collectively referred to as P2P devices.

Reference numeral 204 denotes a DHCP client control unit that is started when the GO Negotiation control unit 203 determines that the role of the communication device is a wireless LAN station. Reference numeral 205 denotes a DHCP server control unit that is started when the GO Negotiation control unit 203 determines that the role of the communication device is a wireless LAN access point.

Reference numeral 206 denotes a WPS enrollee control unit that receives communication parameters necessary for wireless LAN communication from an external WPS registrar device. Like the DHCP client control unit 204, the WPS enrollee control unit 206 operates when the role of the communication device is a wireless LAN station. Reference numeral 207 denotes a WPS registrar control unit that provides communication parameters necessary for wireless LAN communication to an external WPS enrollee device. Like the DHCP server control unit 205, the WPS registrar control unit 207 operates when the role of the communication device is a wireless LAN access point. Communication parameters provided by a WPS registrar are parameters, such as an SSID serving as a network identifier, an encryption key, an encryption scheme, an authentication key, and an authentication scheme.

Reference numeral 208 denotes a wireless LAN packet receiving unit, and reference numeral 209 denotes a wireless LAN packet transmitting unit. The wireless LAN packet receiving unit 208 and the wireless LAN packet transmitting unit 209 are configured to receive and transmit any types of packets including communication protocols for upper layers. Reference numeral 210 denotes a wireless LAN station function control unit. When the communication device operates as a wireless LAN station, the wireless LAN station function control unit 210 performs authentication and encryption processing, and joins a wireless network formed by a device operating as a wireless LAN access point. Reference numeral 211 denotes a wireless LAN access point function control unit. When the communication device operates as a wireless LAN access point function, the wireless LAN access point function control unit 211 forms a wireless network, performs authentication and encryption processing, and manages a communication partner device. The function of one of the wireless LAN station function control unit 210 and the wireless LAN access point function control unit 211 may operate, or the functions of both the wireless LAN station function control unit 210 and the wireless LAN access point function control unit 211 may operate at the same time.

Reference numeral 212 denotes a packet routing control unit. When the wireless LAN access point function control unit 211 is in operation, the packet routing control unit 212 bridges and routes communication packets. Reference numeral 213 denotes a data storage unit that stores and holds the software itself, wireless LAN parameters, and various tables such as a DHCP address table and an ARP table.

Reference numeral 214 denotes a service discovery control unit that performs a service discovery function unique to the Wi-Fi Direct. The service discovery function transmits and receives action frames defined in the IEEE 802.11u to exchange service information owned by a partner communication device. Specifically, the service discovery function transmits an SD Query and receives an SD Response as a response, or receives an SD Query from a partner device and transmits an SD Response as a response.

Reference numeral 215 denotes a P2P Invitation function control unit that controls an Invitation function defined in the Wi-Fi Direct standard. The Invitation function will not be described in detail here, as it is defined in the Wi-Fi Direct specification. The Invitation function is a function in which a GO device or a CL device promotes connection of a P2P device having an undetermined role as a P2P client.

Reference numeral 216 denotes a service providing unit that provides a service in the application layer. The application layer refers to a service providing layer in the upper layers (fifth and higher layers) of the OSI reference model. That is, the service providing unit 216 provides, for example, a print function (print service), an image streaming function (moving image streaming service), or a file transfer function (file transfer service).

Reference numeral 217 denotes a service receiving unit in the application layer. The service receiving unit 217 receives a service provided by a service providing unit in an application layer of a partner device, and uses the received service. That is, the service receiving unit 217 has a function of transmitting printed matter to a print service providing device, or a function of transmitting a moving image to a digital display.

All the function blocks illustrated in FIG. 2 are not limited to those provided by software, and may be provided by hardware. The function blocks illustrated in FIG. 2 interrelate to one another. The function blocks illustrated in FIG. 2 are merely an example. A plurality of function blocks may form a single function block, or any of the function blocks may be divided into a plurality of function blocks.

FIG. 3 illustrates a communication device A 32, a communication device B 33, a communication device C 34, a communication device D 35, a communication device E 36, and a network A 31 (hereinafter referred to as a network A) formed by the communication device A and the communication device B. Each of these devices has the configurations illustrated in FIGS. 1 and 2. The communication devices A, B, C, D, and E will be referred to as STA-A, STA-B, STA-C, STA-D, and STA-E, respectively, in the following description.

The first embodiment deals with a case where, for execution of a service such as print or video streaming, service search processing is performed after completion of connection processing in the wireless layer in advance.

Figure 4:
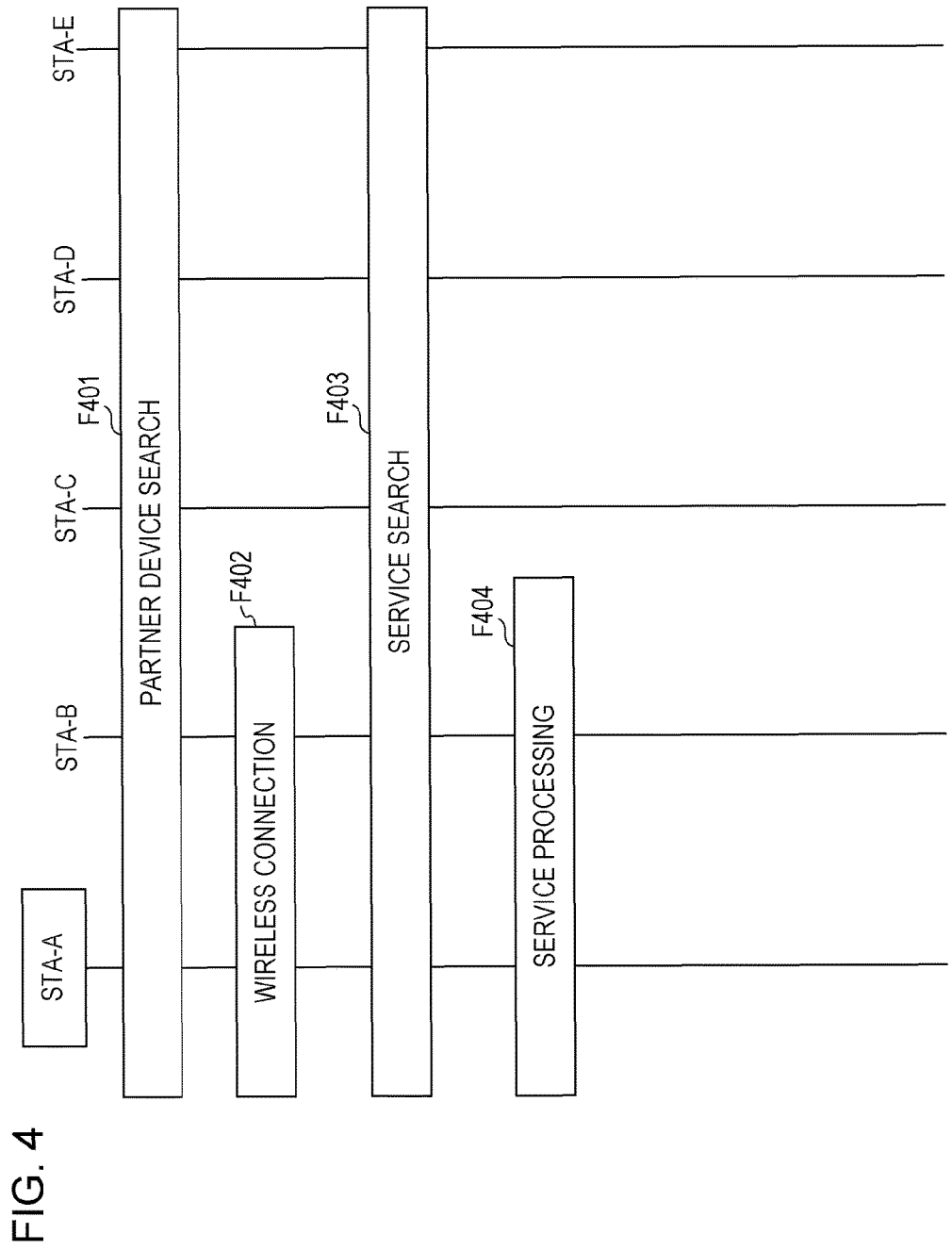
FIG. 4 is an operation sequence diagram in a first embodiment.

FIG. 4 is a diagram illustrating a sequence of operations between devices. In a communication device (which is the STA-A here) that wants to receive a service, the Discovery control unit 202 performs processing that searches for a partner device (F401). In accordance with a user instruction, the STA-A performs wireless connection with the STA-B (F402). The wireless connection refers to a connection method defined in the Wi-Fi Direct specification described above. At this point, one of the STA-A and the STA-B operates as a GO and the other operates as a CL.

After completion of the wireless connection in F402, the STA-A searches for a service providing device that provides the desired service (F403). If the STA-B is a device that provides the desired service, the STA-A receives the service from the STA-B and performs service processing (F404). Specifically, if the STA-A is a digital camera and wants to print a picked-up image, the STA-A searches for a printer having a print function and wirelessly performs print processing. If the STA-A is a camcorder, the STA-A searches for a projector having a projecting function and wirelessly plays back a captured moving image in a streaming manner.

Figure 5:
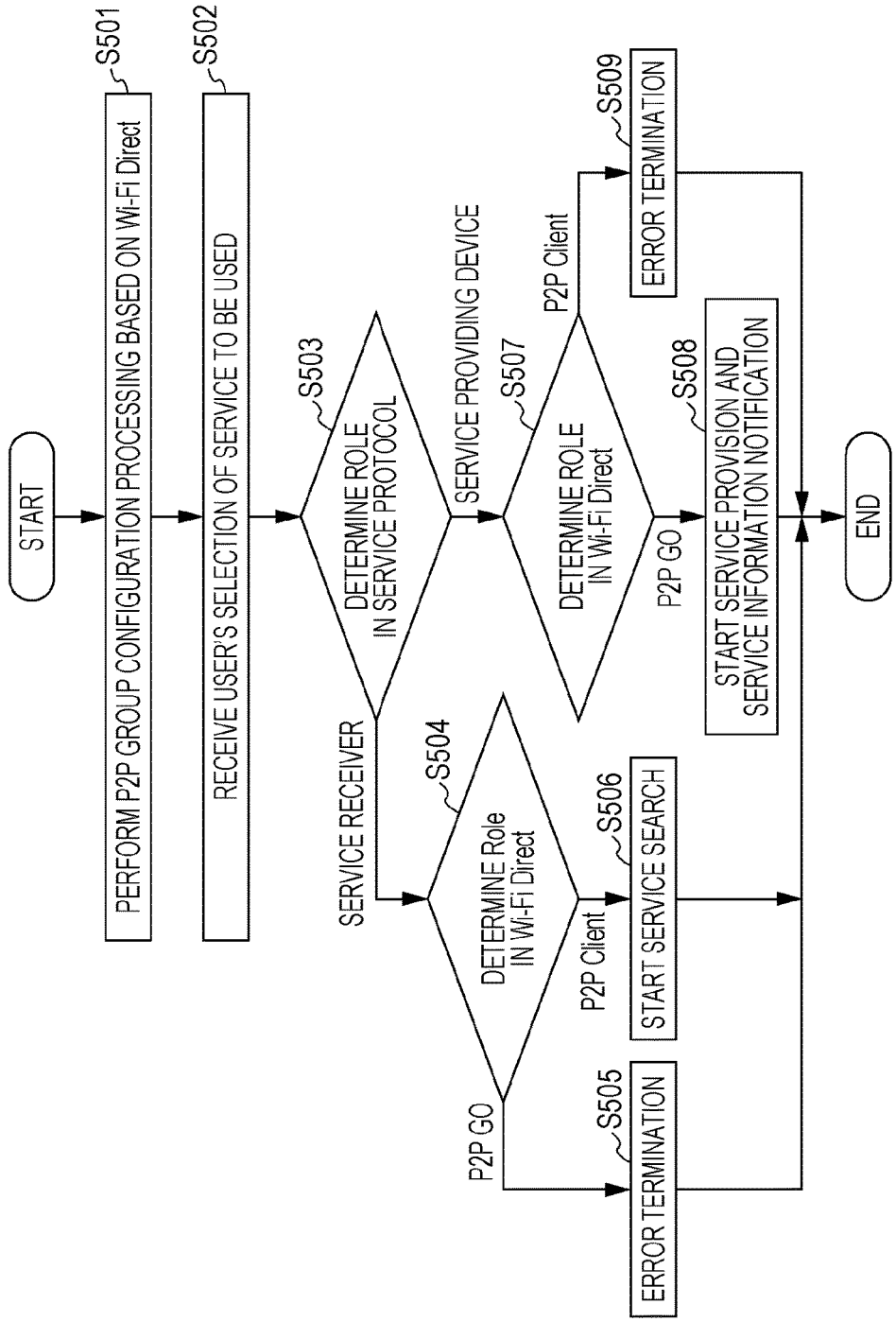
FIG. 5 is a flowchart illustrating an operation of a device in the first embodiment.

FIG. 5 is a flowchart illustrating an operation of a communication device according to the present embodiment. Each step of the flowchart is processed when the control unit 102 executes a program stored in the storage unit 103.

First, the communication device performs P2P group configuration processing based on the Wi-Fi Direct specification (S501). This processing corresponds to the processing in F401 and F402 in FIG. 4, and determines the roles in the wireless layer through a negotiation between communication devices. At this point, the role of the communication device is determined to be either a GO or a CL. Then the communication device receives a user's selection of a service to be used (e.g., print, video streaming) (S502).

In S503, the communication device judges whether the communication device is a service using device or a service providing device (S503). In the present embodiment, if the service in the application layer is a print service, the service using device is a device having an image or document to be printed, and the service providing device is a device having a print function. For example, the former is a digital camera or a smartphone and the latter is a printer. The service using device transmits data to be printed to the service providing device. The service providing device receives the print data transmitted from the service using device and executes print processing. If the service in the application layer is a moving image streaming service, the service using device is a video recording device, such as a digital camera or a camcorder, and the service providing device is an image display device, such as a digital TV or a projector.

If the service to be used is DLNA (registered trademark), for example, the service using device is a digital media server (DMS) and the service providing device is a digital media renderer (DMR). The DLNA standard deals with various device classes, and what is described here is merely an example. Please refer to the DLNA standard for the details.

In Wi-Fi miracast (registered trademark) that has been supported by a growing number of products in recent years, a video display device called Sink is the service providing device, and a video storage device called Source is the service using device.

In the case of devices that support the UPnP protocol, the service providing device is a UPnP device and the service using device is a control point. The service described here and roles in the service are given merely as examples, and are not intended to be restrictive.

In S503, the communication device may judge whether the communication device is a service providing device or a service using device by determining which of the functions is possessed by the communication device. Alternatively, the judgment may be made on the basis of the user's instruction received in S502. Specifically, if the user instructs the communication device to search for a service providing device in S502, the communication device judges that the communication device is a service using device that receives a service provided by the service providing device. On the other hand, if the user instructs the communication device to provide a service in S502, the communication device judges that the communication device is a service providing device that provides a service to a service using device. In either instruction, the user specifies the type of service to be received or provided.

Because the service providing device needs to wait for connection from a plurality of service using devices, it is desirable that the role of the service providing device in the wireless layer be an access point function, that is, a P2P group owner in the Wi-Fi Direct.

If the communication device is judged to be a service using device in S503, the communication device checks the role in the P2P group based on the Wi-Fi Direct specification configured in S501 (S504). If the communication device is judged to be a P2P group owner in S504, the communication device terminates the process and disconnects the wireless communication (S505). This is to prevent the GO from operating as a service using device. In S505, an error termination message is displayed on the display unit 105 of the communication device. The message may indicate that the GO's operation as a service using device is restricted. This allows the user to see why the error has occurred. Along with the message, the display unit 105 may display buttons for instructions for reconnection in the wireless layer.

On the other hand, if the communication device is judged to be a P2P client in S504, the communication device starts to search for a service providing device that provides a desired service (S506). If the service providing device can be detected by this search processing, connection processing at a service level is performed, and the desired service is carried out. That is, connection processing in a layer (e.g., application layer) higher than the wireless layer is performed, and the desired service is executed. The processing in S506 corresponds to the processing in F403 and F404 in FIG. 4, and the service discovery function unique to the Wi-Fi Direct is executed.

If the communication device is judged to be a service providing device in S503, the communication device checks the role in the P2P group configured in S501 (S507). If the communication device is judged to be a P2P group owner in S507, the communication device starts to provide a service and performs processing for notification of device's service information. Then, if the communication device is subjected to a service search by a service using device and receives a connection request, the communication device performs connection processing for connecting with the service using device at the service level, and provides the desired service. That is, the communication device performs connection processing in a layer (e.g., application layer) higher than the wireless layer, and executes the desired service. This processing corresponds to the processing executed by the STA-B in F403 and F404 in FIG. 4.

On the other hand, if the communication device is judged to be a P2P client in S507, the communication device terminates the process and disconnects the wireless communication (S509). This is to prevent the CL from operating as a service providing device. In S509, an error termination message is displayed on the display unit 105 of the communication device. The message may indicate that the CL's operation as a service providing device is restricted. This allows the user to see why the error has occurred. Along with the message, the display unit 105 may display buttons for instructions for reconnection in the wireless layer.

As described above, according to the present embodiment, when a wireless network is formed in advance, a service providing device can be limited to a wireless LAN access point function. When the wireless LAN access point function is implemented by the service providing device, it is possible to improve convenience of the service using device.

Second Embodiment

The first embodiment describes an example where a service search and connection in an upper layer are performed after completion of wireless connection via the Wi-Fi Direct. The second embodiment describes a case where a service search is performed before wireless connection is established, and wireless connection is established only when a desired service is present.

The configuration of each communication device in the present embodiment will not be described here, as it is the same as that of the first embodiment illustrated in FIGS. 1 and 2.

Figure 6:
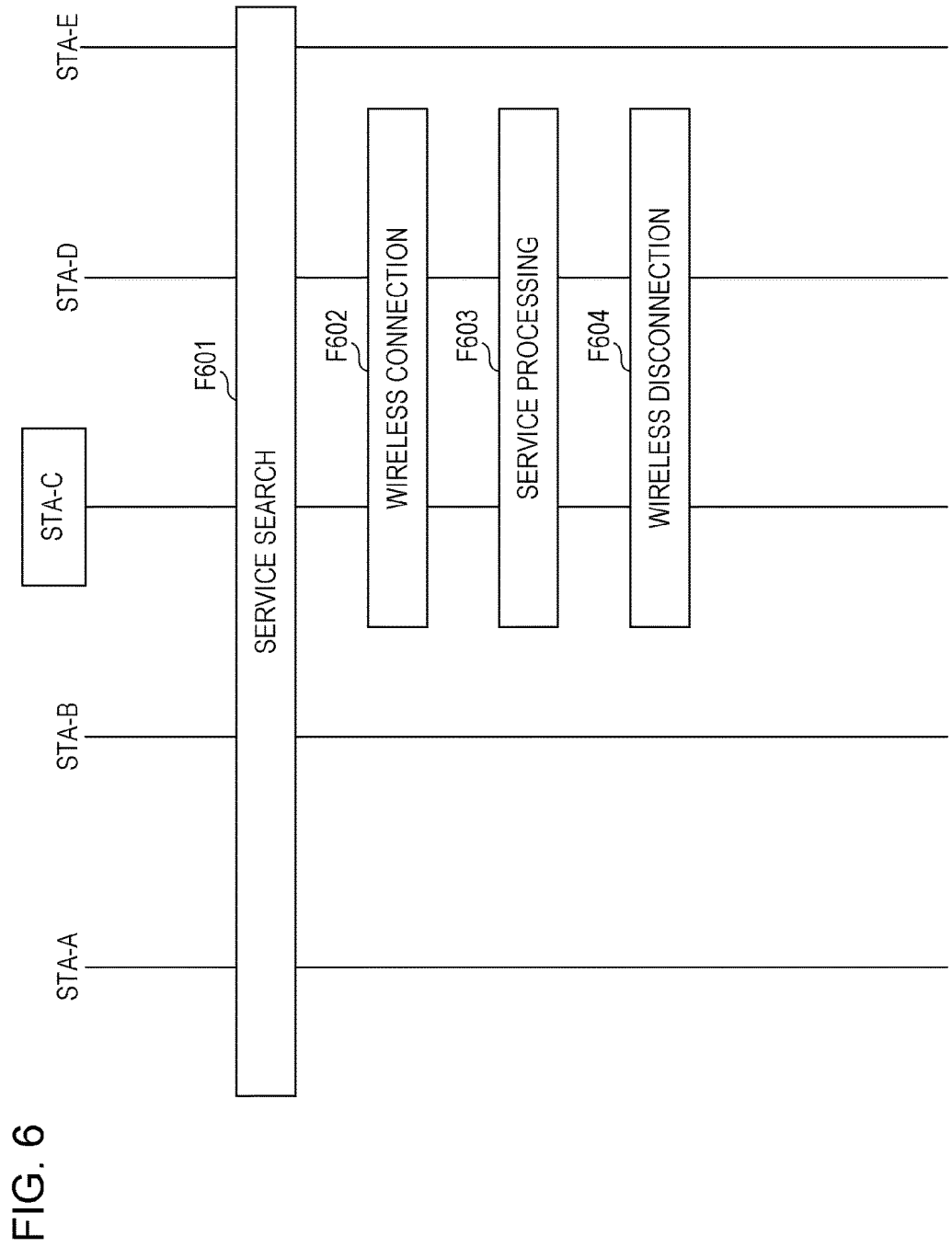
FIG. 6 is an operation sequence diagram in a second embodiment.

FIG. 6 is a diagram illustrating a sequence of operations between devices. A communication device (which is the STA-C here) that wants to receive a service searches for a service providing device that provides a desired service (F601). If the STA-D provides the desired service, the STA-C performs wireless connection with the STA-D (F602). The wireless connection refers to a connection method defined in the Wi-Fi Direct specification described above.

After completion of the wireless connection in F602, the STA-C receives the service from the STA-D and performs service processing (F603). Specifically, if the STA-C is a digital camera and wants to print a picked-up image, the STA-C searches for a printer having a print function and wirelessly performs print processing. If the STA-C is a camcorder, the STA-C searches for a projector having a projecting function and wirelessly plays back a captured moving image in a streaming manner.

After completion of the service processing specified by the user, the wireless connection is disconnected (F604).

Figure 7:
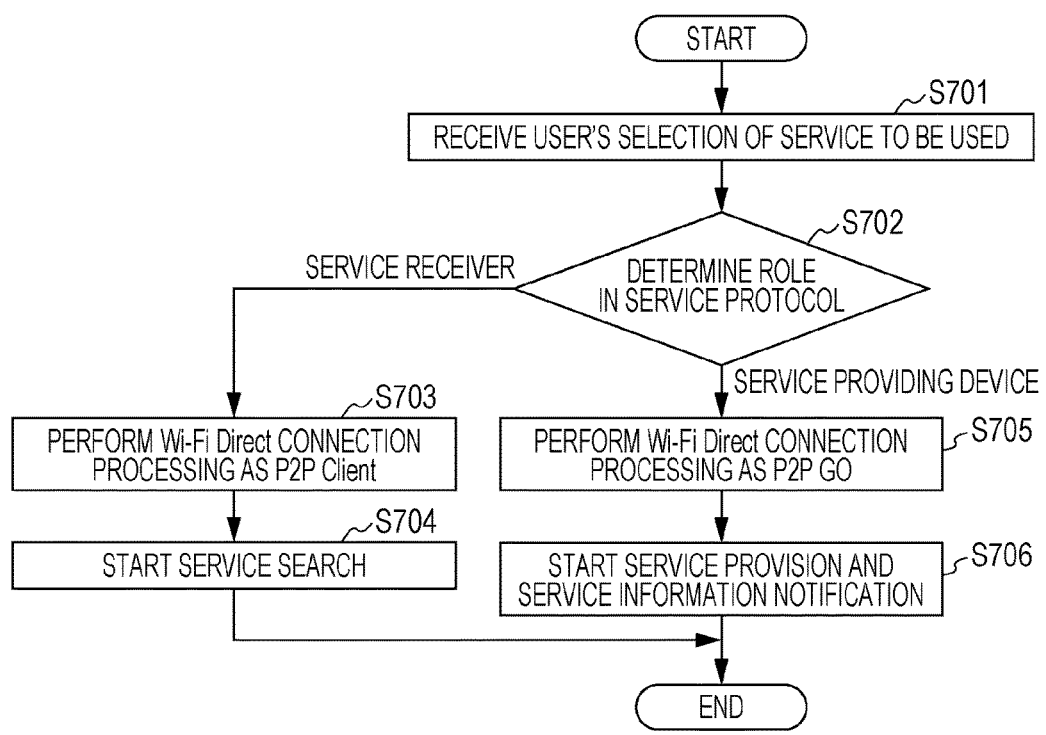
FIG. 7 is a flowchart illustrating an operation of a device in the second embodiment.

FIG. 7 is a flowchart illustrating an operation of a communication device according to the present embodiment. Each step of the flowchart is processed when the control unit 102 executes a program stored in the storage unit 103.

First, the communication device receives a user's selection of a service to be used (e.g., print, video streaming) (S701).

Then the communication device judges whether the communication device is a service using device or a service providing device (S702). If the service in the application layer is a print service, the service using device is a device having an image or document to be printed, and the service providing device is a device having a print function. For example, the former is a digital camera or a smartphone and the latter is a printer. The service using device transmits data to be printed to the service providing device. The service providing device receives the print data transmitted from the service using device and executes print processing. If the service in the application layer is a moving image streaming service, the service using device is a video recording device, such as a digital camera or a camcorder, and the service providing device is an image display device, such as a digital TV or a projector.

If the service to be used is DLNA (registered trademark), for example, the service using device is a digital media server (DMS) and the service providing device is a digital media renderer (DMR). The DLNA standard deals with various device classes, and what is described here is merely an example. Please refer to the DLNA standard for the details.

In Wi-Fi miracast (registered trademark) that has been supported by a growing number of products in recent years, a video display device called Sink is the service providing device, and a video storage device called Source is the service using device.

In the case of devices that support the UPnP protocol, the service providing device is a UPnP device and the service using device is a control point. The service described here and roles in the service are given merely as examples, and are not intended to be restrictive.

In S702, the communication device may judge whether the communication device is a service providing device or a service using device by determining which of the functions is possessed by the communication device. Alternatively, the judgment may be made on the basis of the user's instruction received in S701. Specifically, if the user instructs the communication device to search for a service providing device in S701, the communication device judges that the communication device is a service using device that receives a service provided by the service providing device. On the other hand, if the user instructs the communication device to provide a service in S701, the communication device judges that the communication device is a service providing device that provides a service to a service using device. In either instruction, the user specifies the type of service to be received or provided.

If the communication device is judged to be a service using device in S702, the communication device serves as a P2P client and performs P2P group configuration processing based on the Wi-Fi Direct specification (S703). Then the communication device starts to search for a service providing device (S704). If the service providing device can be detected by this search processing, connection processing at a service level is performed, and the desired service is carried out. That is, connection processing in a layer (e.g., application layer) higher than the wireless layer is performed, and the desired service is executed.

If the communication device is judged to be a service providing device in S702, the communication device serves as a P2P group owner and performs P2P group configuration processing based on the Wi-Fi Direct specification (S705).

Next, the communication device starts to provide a service and performs processing for notification of device's service information (S706). Then, if the communication device is subjected to a service search by a service using device and receives a connection request, the communication device performs connection processing for connecting with the service using device at the service level, and provides the desired service. That is, the communication device performs connection processing in a layer (e.g., application layer) higher than the wireless layer, and executes the desired service.

S703 and S704 may be performed in a reverse order. That is, as illustrated in FIG. 6, the service search may be followed by execution of connection processing in the wireless layer.

As described above, the present embodiment makes it possible to form a wireless LAN topology corresponding to a service selected by the user. In particular, when the wireless LAN access point function is implemented by the service providing device, it is possible to improve convenience of the service using device.

When the user simply selects a service that the user wants to use or provide, the device's role in the wireless layer can be automatically set to one which is appropriate for a service using or providing device.

Third Embodiments

The first and second embodiments have described GO Negotiation protocol control that associates the roles of the P2P client and the P2P group owner in accordance with the service using device and the service providing device. The present embodiment describes an operation in a Persistent mode defined in the Wi-Fi Direct specification. The Persistent mode refers to a mode in which wireless connection information about wireless connection between the communication device and another communication device is permanently stored. The wireless connection information includes an encryption scheme, an encryption key, network identification information, and a P2P operation mode. In operation in the present mode, the GO Negotiation protocol does not operate, and the stored wireless connection information determines the roles of the P2P client and the P2P group owner. This shortens the connection time. In operation in the Persistent mode, control is executed in which no restriction is placed on the operations of the P2P client and the P2P group owner depending on the service using device and the service providing device. That is, priority is given to the operation in either the P2P client or the P2P group owner in accordance with the stored wireless connection information.

Other Embodiments

Each of the embodiments described above shows an example for carrying out the present invention, and various changes can be made within the scope of the present invention. The first to third embodiments described above may be appropriately combined. The user may make a selection as to whether each communication device operates in accordance with either the first embodiment or the second embodiment.

The communication devices according to the embodiments described above are not limited to digital cameras or printers. The communication devices may be PCs or tablet terminals, or may be mobile terminals, such as mobile phones or smartphones. The communication devices may be image processing devices, such as copiers, scanners, faxes, or multifunction peripherals, or may be digital consumer appliances, such as televisions or recorders.

The embodiments have been described using an IEEE 802.11-compliant wireless LAN as an example. However, the present invention may be implemented in other types of wireless communication, such as wireless USB, MBOA, Bluetooth (registered trademark), UWB, and ZigBee (registered trademark). The present invention may be implemented in a wired communication medium, such as a wired LAN. Note that MBOA stands for Multi Band OFDM Alliance. UWB includes wireless USB, wireless 1394, and WINET.

The present invention can also be implemented by executing the following processing. That is, the processing involves supplying software (program) for implementing the functions of the embodiments described above to a system or apparatus via a network or various storage media, and causing a computer (or CPU, MPU, etc.) of the system or apparatus to read and execute program code. In this case, the program and a storage medium that stores the program constitute the present invention.

The present invention makes it possible to perform connection control for a wireless layer appropriate for service execution in an application layer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device having a functionality and operating in a wireless network, the communication device comprising:
  one or more processors; and
  one or more memories containing instructions that, when executed by the one or more processors, cause the one or more processors to perform operations comprising:
  forming a network by the communication device being caused to operate as an access point;
  joining a network by the communication device being caused to operate as a station;
  judging whether the communication device operates as a service providing device that displays received video data or as a service using device that transmits video data, in a case where the communication device performs a video streaming service; and
  determining, in accordance with a result of the judging and a protocol that is able to determine whether the communication device operates as an access point or a station, that the communication device operates as the access point in a case where the communication device operates as the service providing device, and that the communication device operates as the station in a case where the communication device operates as the service using device.

2. The communication device according to claim 1, wherein the access point and the station are an access point and a station in an IEEE 802.11-compliant wireless LAN.

3. The communication device according to claim 1, wherein a judgment made in the judging is based on a function that the communication device has.

4. The communication device according to claim 1, wherein a judgment made in the judging is based on a user input.

5. The communication device according to claim 1, wherein if the communication device operates as the access point, the communication device operates as a device that provides parameters for wireless communication and as a DHCP server, whereas if the communication device operates as the station, the communication device operates as a device that uses parameters for wireless communication and as a DHCP client.

6. A method for controlling a communication device, the method comprising:
  forming a network by the communication device being caused to operate as an access point;
  joining a network by the communication device being caused to operate as a station;
  judging whether the communication device operates as a service providing device that displays received video data or as a service using device that transmits video data, in a case where the communication device performs a video streaming service; and
  determining, in accordance with a result of the judging and a protocol that is able to determine whether the communication device operates as an access point or a station, that the communication device operates as the access point in a case where the communication device operates as the service providing device, and that the communication device operates as the station in a case where the communication device operates as the service using device.

7. A non-transitory machine readable medium having instructions that, when executed by one or more processors, cause the one or more processors to perform operations comprising:
  forming a network by the communication device being caused to operate as an access point;
  joining a network by the communication device being caused to operate as a station;
  judging whether the communication device operates as a service providing device that displays received video data or as a service using device that transmits video data, in a case where the communication device performs a video streaming service; and
  determining, in accordance with a result of the judging and a protocol that is able to determine whether the communication device operates as an access point or a station, that the communication device operates as the access point in a case where the communication device operates as the service providing device, and that the communication device operates as the station in a case where the communication device operates as the service using device.

8. The communication device according to claim 1, wherein the service providing device is Sink in Wi-Fi miracast, and the service using device is Source in Wi-Fi miracast.

* * * * *